(12) United States Patent
Konuskan et al.

(10) Patent No.: US 9,723,605 B2
(45) Date of Patent: Aug. 1, 2017

(54) METHODS AND NODES FOR CONTROLLING UPLINK TRANSMISSIONS

(71) Applicant: Telefonaktiebolaget L M Ericsson (publ), Stockholm (SE)

(72) Inventors: Cagatay Konuskan, Linköping (SE); Billy Hogan, Sollentuna (SE); Waikwok Kwong, Solna (SE); Gerardo Agni Medina Acosta, Järfälla (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 70 days.

(21) Appl. No.: 14/408,346

(22) PCT Filed: Oct. 28, 2014

(86) PCT No.: PCT/SE2014/051267
§ 371 (c)(1),
(2) Date: Dec. 16, 2014

(87) PCT Pub. No.: WO2015/152784
PCT Pub. Date: Oct. 8, 2015

(65) Prior Publication Data
US 2015/0282205 A1 Oct. 1, 2015

Related U.S. Application Data

(60) Provisional application No. 61/973,439, filed on Apr. 1, 2014.

(51) Int. Cl.
*H04W 72/04* (2009.01)
*H04W 74/00* (2009.01)
*H04W 28/22* (2009.01)

(52) U.S. Cl.
CPC ....... *H04W 72/042* (2013.01); *H04W 74/006* (2013.01); *H04W 28/22* (2013.01)

(58) Field of Classification Search
CPC .. H04W 72/042; H04W 28/22; H04W 74/006
(Continued)

(56) References Cited

U.S. PATENT DOCUMENTS

2006/0056355 A1* 3/2006 Love ................. H04W 74/0866
370/332
2006/0114877 A1* 6/2006 Heo ....................... H04L 1/0029
370/342

(Continued)

OTHER PUBLICATIONS

U.S. Appl. No. 61/732,728, filed Dec. 3, 2012.
(Continued)

*Primary Examiner* — Obaidul Huq
(74) *Attorney, Agent, or Firm* — Baker Botts, LLP

(57) ABSTRACT

A network node (100), a wireless device (102) and methods therein, for controlling uplink transmission from the wireless device (102), e.g. in a time division multiplexing scheme. The network node (100) signals (1:2) an Absolute Grant Scope, AGS, bit to the wireless device (102), wherein the AGS bit indicates one of:

the wireless device (102) is granted for uplink transmission (204) during a single Transmit Time Interval, TTI, and the wireless device (102) is granted for uplink transmission (206) until a next grant is signalled to the wireless device (102).

17 Claims, 4 Drawing Sheets

(58) Field of Classification Search
USPC .... 370/310, 328, 329, 338, 351, 389, 395.1, 370/395.4; 455/403, 422.1
See application file for complete search history.

(56) References Cited

U.S. PATENT DOCUMENTS

| | | | |
|---|---|---|---|
| 2009/0196230 A1* | 8/2009 | Kim | H04W 74/002 370/328 |
| 2010/0113004 A1* | 5/2010 | Cave | H04W 52/365 455/422.1 |
| 2010/0130219 A1 | 5/2010 | Cave et al. | |
| 2013/0039393 A1 | 2/2013 | Choi | |

OTHER PUBLICATIONS

3GPP TS 25.212 V11.7.0 (Mar. 2014); Technical Specification; 3rd Generation Partnership Project; Technical Specification Group Radio Access Network; Multiplexing and channel coding (FDD) (Release 11) Mar. 2014.

3GPP TSG-RAN WG1 Meeting #76-BIS; Shenzhen, P.R. China, Title: Comparative Analysis of TDM Scheduler Schemes for Secondary Carriers (R1-141692), Mar. 31-Apr. 4, 2014.

3GPP TSG RAN Meeting #62; Busan, Korea, Title: New Work Item proposal: Further EUL enhancements—Core (RP-132078), Dec. 3-6, 2013.

3GPP TSG RAN Meeting #62, Busan Korea, Title: New Work Item proposal: Further EUL enhancements (RP-132078), Dec. 3-6, 2013.

3GPP Tsg Ran Meeting #62, Busa, Korea, Title: New Work Item proposal: Further EUL enhancements—Performance (RP-132078) Dec. 3-6, 2013.

3GPP TR 25.700 V12.0.0 (Dec. 2013-12) 3rd Generation Partnership Project; Technical Specification Group Radio Access Network; Study on Further Enhanced Uplink (EUL) enhancements (Release 12), 2013.

3GPP TS 25.321 V11.5.0 (Dec. 2013) 3rd Generation Partnership Project; Technical Specification Group Radio Access Network; Medium Access Control (MAC) protocol specification (Release 11), 2013.

PCT International Search Report and Written Opinion of the International Searching Authority for International application No. PCT/SE2014/051267, Jan. 28, 2015.

3GPP TSG-RAN WG1 Meeting #76bis; Shenzhen, China; Title: Solution for improved grant handling for TDM operation (R1-141660), Mar. 31-Apr. 4, 2014.

Decision to Grant Patent issued by the Japanese Patent Office for Application No. JP2016-559951—May 9, 2017 (granted claims also attached).

* cited by examiner

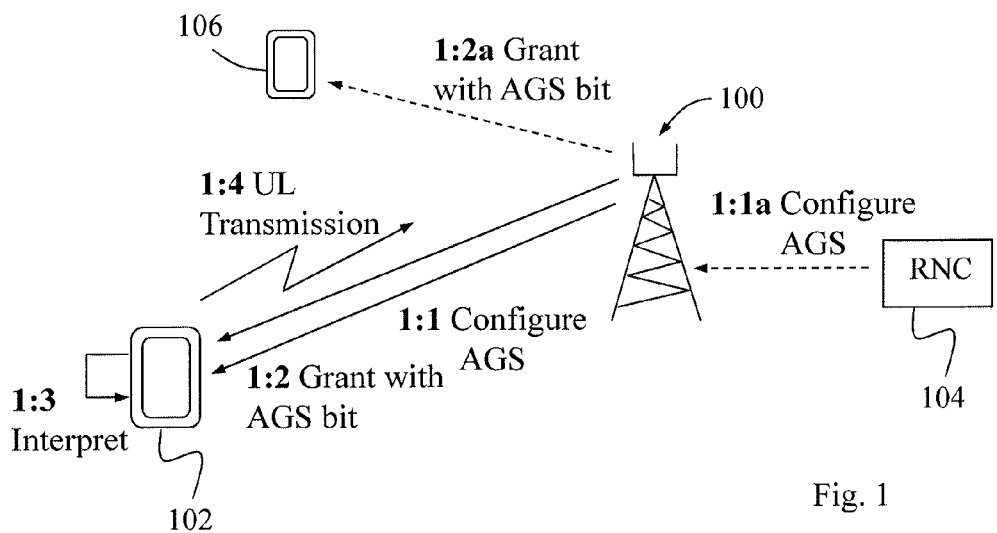
Fig. 1
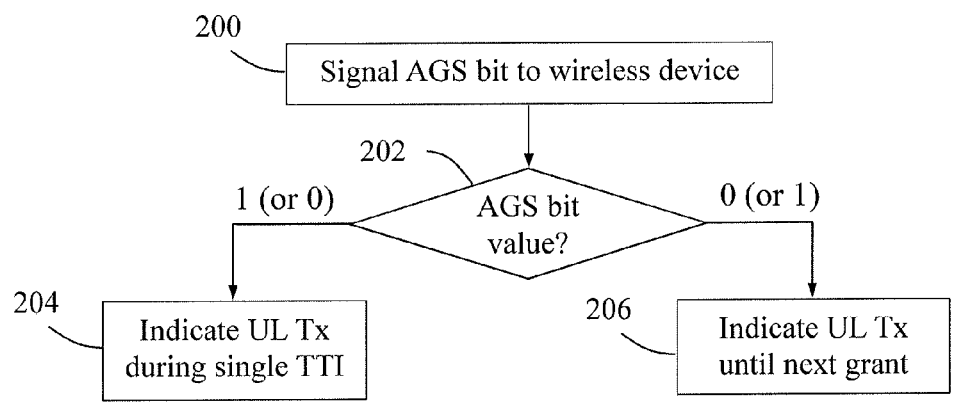
Fig. 2 Method in network node
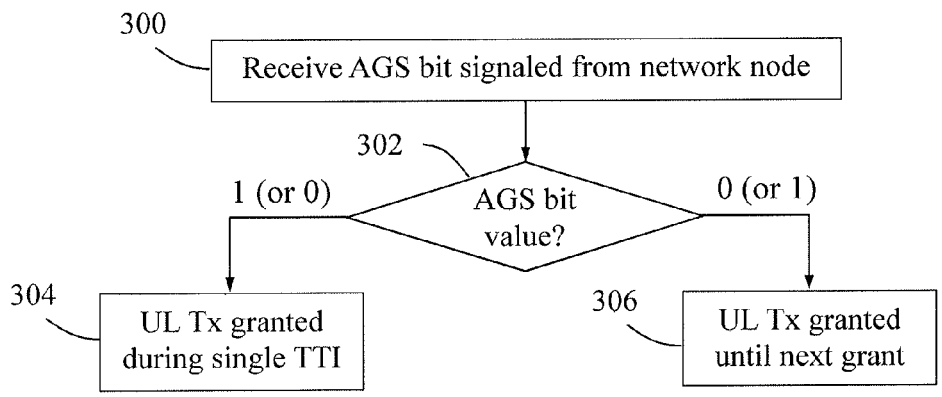
Fig. 3 Method in wireless device

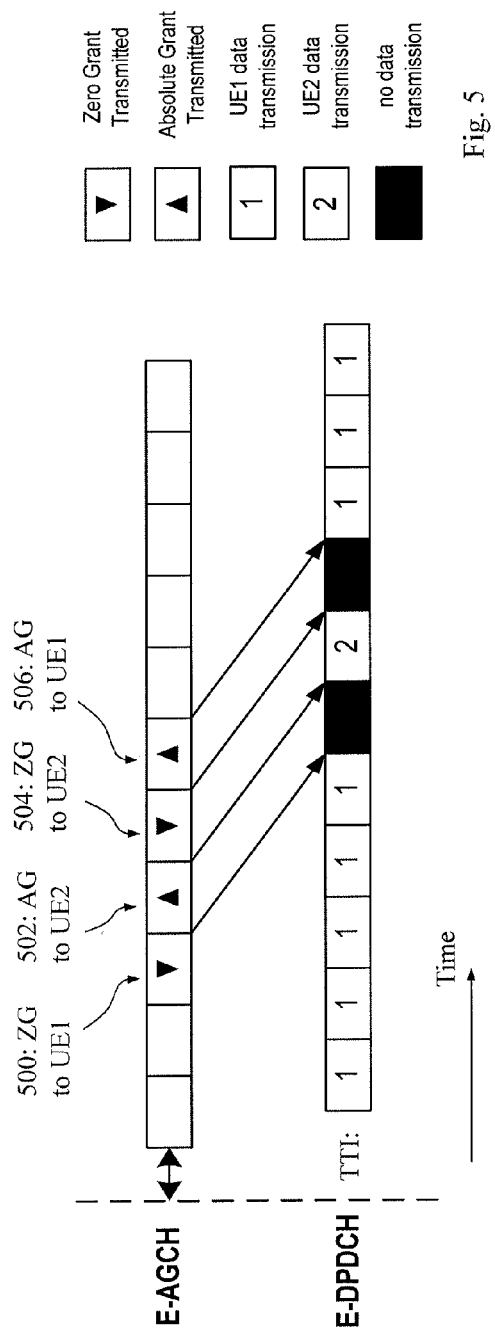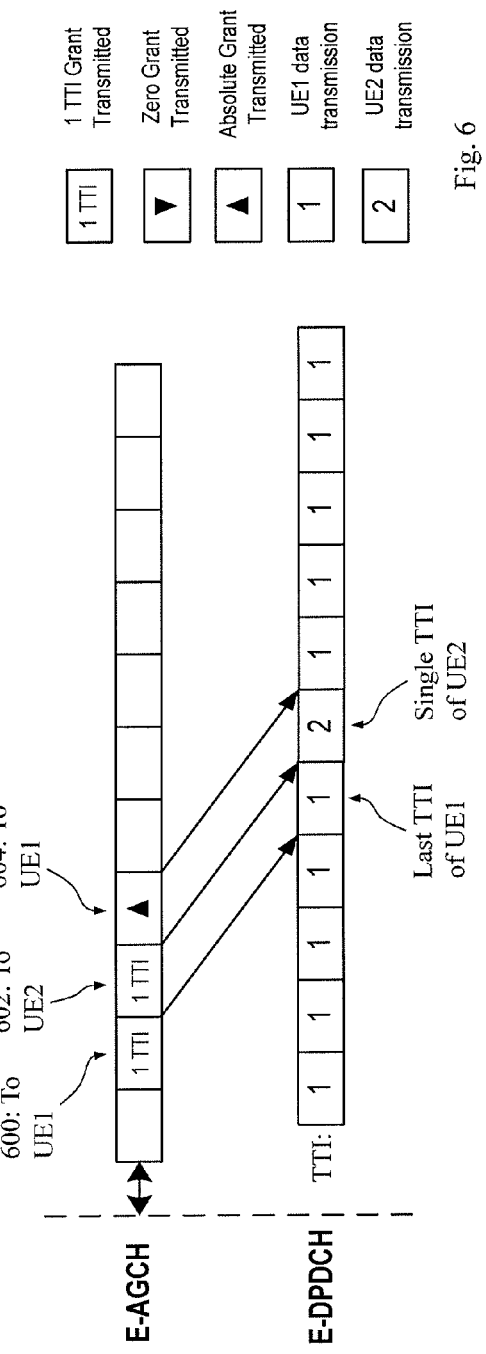
Fig. 5
Fig. 6

METHODS AND NODES FOR CONTROLLING UPLINK TRANSMISSIONS

PRIORITY

This nonprovisional application is a U.S. National Stage Filing under 35 U.S.C. §371 of International Patent Application Serial No. PCT/SE2014/051267 filed Oct. 28, 2014 and entitled "METHODS AND NODES FOR CONTROLLING UPLINK TRANSMISSIONS" and U.S. Provisional Patent Application No. 61/973,439 filed Apr. 1, 2014, both of which are hereby incorporated by reference in their entirety.

TECHNICAL FIELD

The present disclosure relates generally to a network node of a wireless network, a wireless device and methods therein, for controlling uplink transmission from the wireless device, e.g. in a time division multiplexing scheme.

BACKGROUND

In recent years, different types of wireless networks have been developed to provide radio communication for various wireless devices in different areas such as cells. The wireless networks, also commonly referred to as cellular or mobile networks, are constantly improved to provide better capacity, quality and coverage to meet the demands from subscribers using services and increasingly advanced terminals for communication, such as smartphones and tablets, which often require considerable amounts of bandwidth and resources for data transport in the networks. Therefore, it is often a challenge to achieve high capacity and good performance, e.g. in terms of high data throughput, low latency and low rate of dropped or lost data, in the radio communication between base stations in the wireless network and various wireless devices communicating with the base stations.

In the field of radio communication in wireless networks, the terms "wireless device" and "User Equipment, UE" are commonly used and will be interchangeably used in this disclosure to represent any mobile phone, tablet, Machine-to-Machine (M2M) device or laptop computer capable of radio communication with a wireless network including receiving downlink signals transmitted from a serving network node and sending uplink signals to the network node. Sometimes the term "user" is used instead of UE. Further, the terms "network node", "base station" and "Node B" may be interchangeably used in this disclosure to represent any node of a wireless network that can communicate uplink and downlink radio signals with wireless devices or UEs. The network node described here may, without limitation, be a base station or any other node that controls transmissions in the network.

In order to improve capacity and performance in the wireless network, various features can be employed that are intended to make the radio communication more efficient in terms of resource usage. In particular, it is desirable to reduce the amount of interference generated by uplink transmissions made by wireless devices, which in turn could improve the capacity and performance. For example, transmissions with high bitrate may generate high interference for others. High bitrate may also require a high Signal-to-Interference Ratio, SIR, for successful communication. Since the signal strength is limited by the available device power, the SIR in a multi-user scenario may be severely degraded, leading to much lower maximum bitrate for the devices and also a lower overall system throughput.

This interference issue may be addressed by employing a so-called "clean carrier" which is dedicated to high bitrate transmissions in a Time Division Multiplexing, TDM, scheme where uplink transmissions are separated in different Transmission Time Intervals, TTIs, assigned to the wireless devices. Thereby, less rigorous power control can be employed since transmission on this carrier will not disturb transmissions on other carriers separated in frequency. In general, it is of interest for network operators to improve capacity in their networks by utilizing the available radio resources as efficiently as possible. In a TDM scheme the radio resources are commonly defined by time and frequency where only one wireless device at a time is allowed to transmit on a particular frequency, i.e. during separate TTIs, which is well-known in this field. This process is controlled by signaling so-called grants to the wireless devices.

However, it is a problem that the process of controlling uplink transmissions, e.g. in a TDM scheme, may sometimes require much signaling between the wireless devices and the network nodes for multiplexing different wireless devices in separate TTIs. Another problem is that conventional signaling may result in less than optimal utilization of available radio resources in terms of carriers and TTIs, such that some TTIs may go unused as a result of the currently employed signaling schemes, which is ultimately a waste of capacity.

SUMMARY

It is an object of embodiments described herein to address at least some of the problems and issues outlined above. It is possible to achieve this object and others by using a network node, a wireless device and methods therein, as defined in the attached independent claims.

According to one aspect, a method is performed by a network node of a wireless network, for controlling uplink transmission from a wireless device. In this method, the network node signals an Absolute Grant Scope, AGS, bit to the wireless device, wherein the AGS bit indicates one of: the wireless device is granted for uplink transmission during a single Transmit Time Interval, TTI, and the wireless device is granted for uplink transmission until a next grant is signalled to the wireless device. For example, a first value of the AGS bit, 0 or 1, may indicate a grant for "persistent" uplink transmission during any number of TTIs, i.e. until further notice or until there is no more data to transmit, and a second different value of the AGS bit, 1 or 0, may indicate a grant for uplink transmission during a single TTI after which the device should not transmit.

According to another aspect, a network node of a wireless network is arranged to control uplink transmission from a wireless device. The network node comprises means configured to signal an Absolute Grant Scope, AGS, bit to the wireless device, wherein the AGS bit indicates one of: the wireless device is granted for uplink transmission during a single Transmit Time Interval, TTI, and the wireless device is granted for uplink transmission until a next grant is signalled to the wireless device.

According to another aspect, a method is performed by a wireless device being served by a network node of a wireless network, for controlling uplink transmission. In this method, the wireless device receives from the network node signalling with an Absolute Grant Scope, AGS, bit wherein the AGS bit indicates one of: the wireless device is granted for uplink transmission during a single Transmit Time Interval, TTI, and the wireless device is granted for uplink transmission until a next grant is signalled to the wireless device.

According to another aspect, a wireless device is arranged to control uplink transmission when being served by a network node of a wireless network. The wireless device comprises means configured to receive from the network node signalling with an Absolute Grant Scope, AGS, bit wherein the AGS bit indicates one of: the wireless device is granted for uplink transmission during a single Transmit Time Interval, TTI, and the wireless device is granted for uplink transmission until a next grant is signalled to the wireless device.

The above methods and nodes may be configured and implemented according to different optional embodiments to accomplish further features and benefits, to be described below.

A computer program is also provided for each node, the computer program comprising instructions which, when executed on at least one processor, cause the at least one processor to carry out the above method. A carrier is also provided for each node, which contains the above computer program, wherein the carrier is one of an electronic signal, optical signal, radio signal, or a non-tangible computer readable storage medium.

BRIEF DESCRIPTION OF DRAWINGS

The solution will now be described in more detail by means of exemplary embodiments and with reference to the accompanying drawings, in which:

FIG. 1 is a communication scenario illustrating how uplink transmission from a wireless device can be controlled, according to some possible embodiments.

FIG. 2 is a flow chart illustrating a procedure in a network node, according to further possible embodiments.

FIG. 3 is a flow chart illustrating a procedure in a wireless device, according to further possible embodiments.

FIG. 5 illustrates how two wireless devices, UE1 and UE2, can be assigned for uplink data transmission on different TTIs, when a regular procedure is used.

FIG. 6 illustrates how two wireless devices, UE1 and UE2, can be assigned for uplink data transmission on different TTIs, when embodiments described herein are used.

DETAILED DESCRIPTION

Figure 4:
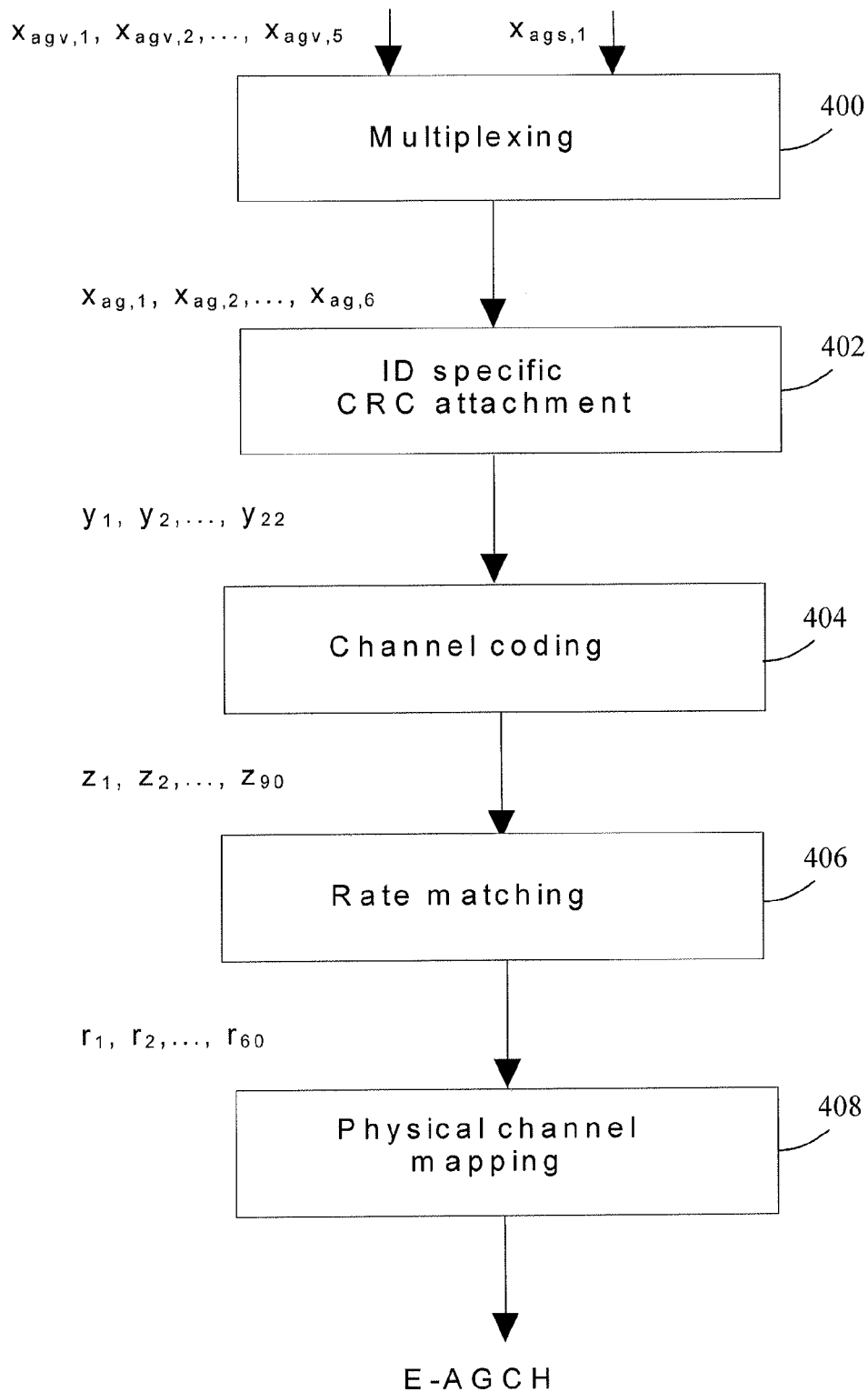
FIG. 4 is a flow chart illustrating a regular coding chain for transmission on an Enhanced Dedicated Channel, E-DCH, Absolute Grant Channel, E-AGCH.

In this disclosure, a solution is presented to enable efficient usage of radio resources for uplink transmission from a wireless device in a TDM scheme. It was mentioned above that considerable amounts of signaling are required between the wireless devices and the network nodes for controlling uplink transmissions in a TDM scheme, particularly for switching between devices on shared transmit frequencies. In this context, the network node commonly sends a signaling message referred to as "grant" to a wireless device which message effectively informs the wireless device whether it is allowed to transmit during certain TTIs. The network node thus assigns different TTIs to allow different wireless devices to transmit on a certain frequency, depending on their needs to transmit and also depending on what radio resources are available. Throughout this disclosure, the term TTI is used to represent any time interval used for transmission and the solution is not limited to any particular definition of TTI.

In conventional solutions, the network node may signal a grant to a wireless device to instruct the device to either start or stop uplink transmission. According to terminology commonly used in the field of wireless communication, a so-called "Absolute Grant", AG, indicates that a wireless device is allowed to perform uplink transmission in certain TTIs assigned to the device, while a so-called "Zero Grant" is used to indicate that a wireless device must stop its uplink transmission. Such grant messages may be signaled on a control channel such as Enhanced Dedicated Channel, E-DCH, Absolute Grant Channel, E-AGCH, which is commonly used in Universal Terrestrial Radio Access Network, UTRAN, and High Speed Downlink Packet Access, HSPA.

However, the conventional signaling scheme described above may result in that some TTIs are left unused when uplink transmission is switched from one wireless device to another. For example, the currently transmitting device must receive a zero-grant before the next device can start transmitting and the network cannot transmit the zero-grant and the new grant simultaneously to both users if they are configured to monitor the same E-AGCH. This typically leaves at least one empty TTI with no transmission. The solution and its embodiments described herein may be used to avoid such unused TTIs which will increase utilization of the available radio resources, particularly in scenarios with several wireless devices having to take turn to transmit one at a time, e.g., in a round-robin fashion. The devices may also frequently require short intermittent uplink transmissions.

An absolute grant signaled from a network node to a wireless device typically comprises an Absolute Grant Value, AGV, which basically defines how the wireless device shall transmit, i.e. at what bitrate. The AGV of a grant may typically comprise a number of bits, e.g. 5 bits which can be denoted $x_{AGV,1}, x_{AGV,2}, \ldots x_{AGV,5}$. In some applications, the network node also adds to the AGV an Absolute Grant Scope, AGS, comprising a single bit denoted $x_{AGS,1}$, to indicate which Hybrid Automatic Repeat Request, HARQ, process the grant is valid for.

HARQ processes are well-known in this field and they are used basically for controlling re-transmission of data that has not been received correctly. The HARQ processes may be used basically for setting up multiple transmission streams to avoid blocking due to occasional need for re-transmission. For example, if the AGS bit is set to 0, the grant is valid for a particular HARQ process, i.e. per HARQ process, and if the AGS bit is set to 1, the grant is valid for all possible HARQ processes. This is the conventional use of the AGS bit according to a current procedure defined in the document TS 25.212 of the Third Generation Partnership Project, 3GPP.

In this solution however, the above-described AGS bit can be utilized instead in a novel way for indicating to the wireless device a granting scheme to employ, that is the AGS bit indicates either that the grant is "persistent" i.e. valid until further notice, or that the grant is valid only for a single TTI. This indication of granting scheme can be accomplished by the two possible values of the single AGS bit such that a first value 0 or 1 indicates a grant for persistent uplink transmission during any number of TTIs, i.e. until further notice, and a second different value 1 or 0 indicates a grant for uplink transmission during a single TTI. Thereby, uplink transmission can be switched between wireless devices without the occurrence of unused TTIs and a reduced amount of signaling may also be accomplished in some cases, which will be explained in more detail below.

Briefly described, if a first wireless device is transmitting persistently, i.e. until further notice, the serving network node may signal a grant to the first device and an AGS bit that indicates that the grant is valid only for a single TTI, such that the first device transmits in that last TTI and then stops its transmission. If the serving network node also signals a grant to another second wireless device, the second device can start uplink transmission in the TTI following the last TTI used by the first device, thus without any unused TTI there between. Furthermore, when an AGS bit is signaled to a device indicating that the grant is valid for a single TTI, it is not necessary to signal a separate zero-grant to make that device stop its transmission, which can be beneficial particularly when the device only needs one TTI for uplink transmission, thus only one control message is needed instead of two in this case.

As a result, the available radio resources can be utilized more efficiently such that capacity and performance will be improved in the network. This is thus a new interpretation of the AGS bit and the network node may configure the wireless device, e.g. by higher layer signaling, how to interpret the AGS bit, either the conventional way related to HARQ process or the novel way related to granting scheme.

The embodiments described herein are applicable for uplink transmissions of any kind of information, including any data and various types of control messages such as measurement reports, requests, acknowledgements, etc. The solution is thus not limited to any particular uplink transmissions.

The solution will now be described first with reference to the communication scenario shown in FIG. 1. In this scenario, a network node 100 is serving a wireless device 102 which includes the sending of grants to control uplink transmissions from the wireless device 102, e.g. in a time division multiplexing scheme. A first action 1:1 illustrates that the network node 100 sends a configuration message to the wireless device 102 effectively instructing the device 102 to interpret the AGS bit in a grant to indicate that the grant allows either persistent transmission or transmission in a single TTI. This configuration message may optionally originate from a controlling node in the network, e.g. a Radio Network Controller, RNC, that is basically responsible for controlling operation of the network node 100 and the wireless device 102, as indicated by an action 1:1a.

The wireless device 102 now knows how to interpret the AGS bit in a grant and that it determines how the grant is valid. In another action 1:2 the network node 100 signals a grant with an AGS bit to the wireless device 102. As mentioned above, a grant for uplink transmission may comprise an AGV of 5 bits and an AGS of 1 bit, the AGV effectively specifying a bit rate for the transmission. Alternatively, a grant may comprise the AGS bit omitting the AGV part in the grant and the wireless device may be configured to transmit with a default bit rate or the like. In this case the AGV is already predefined and not necessary to include in the grant. It may also be possible that the wireless device is actually free to use any bit rate and that the network node has no requirement of bit rate, such that the AGV is not necessary to include in the grant in this case either.

An action 1:3 illustrates schematically that the wireless device 102 interprets the signaled AGS bit as indicating either persistent transmission or a single TTI transmission. In the former case the AGS bit indicates that the wireless device 102 is granted for uplink transmission until a next grant is signaled to the wireless device 102, and in the latter case the AGS bit indicates that the wireless device 102 is granted for uplink transmission during a single TTI. The wireless device then performs uplink transmission accordingly in a final action 1:4.

An optional action 1:2a illustrates that if the wireless device is currently applying persistent transmission, the network node 100 may alternatively signal a grant with an AGS bit to another wireless device 106, which the device 102 may interpret implicitly as an instruction to stop transmitting such that no separate message is required to the device 102. In other words, the network node 100 in this case has a possibility to implicitly indicate that the wireless device 102 should terminate its uplink transmission by signalling the AGS bit to indicate that the other wireless device 106 is granted for uplink transmission. For example, the AGS bit may indicate that the new device 106 is granted for uplink transmission in a single TTI, after which the former device 102 can resume its uplink transmission. An example of how a persistent transmission of one device can be temporarily interrupted for a single TTI allowing another device to transmit therein, will be described further below.

An example of a procedure, performed by a network node of a wireless network when the solution is employed, will now be described with reference to the flow chart in FIG. 2. In this procedure, the network node is operable for controlling uplink transmission from a wireless device, e.g. in a time division multiplexing scheme. The procedure thus involves the network node and a wireless device which may be the above-described network node 100 and wireless device 102, respectively.

A first action 200 illustrates that the network node signals an Absolute Grant Scope, AGS, bit to the wireless device. Another "action" 202 schematically shows that the AGS bit can be one of two possible values, 1 and 0. The AGS bit indicates that the wireless device is granted for uplink transmission during a single TTI, in case the AGS bit has a first value 1 (or 0), which is illustrated as an action 204. Alternatively, the wireless device is granted for uplink transmission until a next grant is signalled to the wireless device, in case the AGS bit has a second different value 0 (or 1), which is illustrated as another action 206. The second value of the AGS bit is thus different from the first value.

The above procedure in the network node may also be described as follows, with further reference to FIG. 1.

A method, performed by a network node 100 of a wireless network, for controlling uplink transmission from a wireless device 102, e.g. in a time division multiplexing scheme, the method comprising signalling 1:2, 200 a grant for uplink transmission and an Absolute Grant Scope, AGS, bit to the wireless device, wherein the AGS bit indicates one of:
 the grant allows the wireless device 102 for uplink transmission 204 during a single Transmit Time Interval, TTI, and
 the grant allows the wireless device 102 for uplink transmission 206 until a next grant is signalled to the wireless device 102.

Another example of a procedure, this time performed by a wireless device when the solution is employed, will now be described with reference to the flow chart in FIG. 3. In this procedure, the wireless device is being served by a network node of a wireless network, for controlling uplink transmission, e.g. in a time division multiplexing scheme. The procedure thus involves the wireless device and the network node which may be the above-described wireless device 102 and network node 100, respectively. A first action 300 illustrates that the wireless device receives from the network node signalling with an Absolute Grant Scope, AGS, bit. As similar to FIG. 2, Another "action" 302 schematically shows that the AGS bit can be one of two possible values, 1 and 0. The wireless device either interprets the AGS bit as indicating that the wireless device is granted for uplink transmission during a single TTI, in case the AGS bit has a first value 1 (or 0), which is illustrated in an action 304. Alternatively, the wireless device interprets the AGS bit as indicating that the wireless device is granted for uplink transmission until a next grant is signalled to the wireless device, i.e. persistent transmission, in case the AGS bit has a second different value 0 (or 1), which is illustrated in another action 306.

The above procedure in the wireless device may also be described as follows, with further reference to FIG. 1.

A method, performed by a wireless device 102 being served by a network node 100 of a wireless network, for controlling uplink transmission, e.g. in a time division multiplexing scheme, the method comprising receiving 1:2, 300 from the network node (100) a grant for uplink transmission and an Absolute Grant Scope, AGS, bit, wherein the AGS bit indicates one of:
  the grant allows the wireless device 102 for uplink transmission 204 during a single Transmit Time Interval, TTI, and
  the grant allows the wireless device 102 for uplink transmission 206 until a next grant is signalled to the wireless device 102.

Some optional but non-limiting embodiments will now be described which may be used for the network node and for the wireless device. In a possible embodiment, the network node may signal the AGS bit in an Enhanced Dedicated Channel, E-DCH, Absolute Grant Channel, E-AGCH. Correspondingly, the wireless device may receive the AGS bit from the network node in an E-AGCH. In another possible embodiment, the network node may signal the AGS bit to grant uplink transmission from the wireless device on a clean carrier dedicated to high bitrate transmissions. Correspondingly, the AGS bit received by the wireless device from the network node may grant uplink transmission on a clean carrier dedicated to high bitrate transmissions.

In further possible embodiments, the network node may trigger the uplink transmission from the wireless device by signalling the AGS bit to indicate that the wireless device is granted for persistent uplink transmission during any number of TTIs, and the network node may then stop the uplink transmission from the wireless device by signalling the AGS bit to indicate that the wireless device should terminate its uplink transmission after a final single TTI. Correspondingly, the wireless device may perform uplink transmission when the AGS bit indicates that the wireless device is granted for persistent uplink transmission during any number of TTIs, and the wireless device may stop the uplink transmission when the AGS bit indicates that the wireless device should terminate its uplink transmission after a final single TTI. An example of this will be described later below with reference to FIG. 6.

In another possible embodiment, the network node may signal the AGS bit to indicate that another wireless device is granted for uplink transmission during a single TTI after the above-mentioned final single TTI. As explained above, the wireless device may be effectively instructed by the network node to stop its transmission by implicit signalling of the AGS bit which is primarily directed to the other wireless device. Correspondingly, the wireless device may terminate its uplink transmission when the AGS bit indicates that another wireless device is granted for uplink transmission during a single TTI after the final single TTI.

In another possible embodiment, a first value of the AGS bit (0 or 1) may indicate a grant for persistent uplink transmission during any number of TTIs, and a second different value of the AGS bit (1 or 0) may indicate a grant for uplink transmission during a single TTI. Correspondingly, the wireless device may interpret a first value of the AGS bit (0 or 1) as indicating a grant for persistent uplink transmission during any number of TTIs, and a second different value of the AGS bit (1 or 0) as indicating a grant for uplink transmission during a single TTI.

In another possible embodiment, the network node may configure the wireless device by higher layer signalling to interpret the AGS bit, e.g. as described above for action 1:1. Correspondingly, the wireless device may be configured by higher layer signalling to interpret the AGS bit. In another possible embodiment, the network node may configure the wireless device to interpret the AGS bit as indicating either a grant per TTI or a grant per Hybrid Automatic Repeat Request, HARQ, process. Correspondingly, the wireless device may be configured by the network node to interpret the AGS bit as indicating either a grant per TTI or a grant per Hybrid Automatic Repeat Request, HARQ, process.

In another possible embodiment, the network node may signal the AGS bit in combination with a signalled specific Absolute Grant Value, AGV. In this case the AGV and the AGS are comprised in the grant. Correspondingly, the wireless device may receive the AGS bit from the network node in combination with a signalled AGV.

It was mentioned above that the AGV and the AGS are typically signalled on an E-AGCH in conventional procedures which may also be applied when the embodiments described herein are used. FIG. 4 illustrates how the AGV and the AGS can be encoded when creating a grant message which the network node sends to the wireless device. This is thus a "coding chain" for transmission on the E-AGCH. This procedure includes multiplexing the AGV bits $x_{AGV,1}$, $x_{AGV,2}$, ... $x_{AGV,5}$ and the AGS bit $x_{AGS,1}$ in step 400, performing an identity-specific Cyclic Redundancy Check, CRC, attachment in step 402, performing channel coding in step 404, performing a rate matching in step 406, and finally performing a physical channel mapping in step 408. These steps are well-known in this field and not necessary to describe here in any detail for the understanding of the embodiments herein. It should however be noted that the ID-specific CRC in step 402 basically allows each device to detect if an AG sent on the E-AGCH is intended for the device or not. The E-AGCH is a so-called "common channel" which all devices monitor, i.e. listen to. Therefore, the network is not able to send an AG to two devices at the same time, which in turn leads to the problem of unused TTI described above.

With reference to some examples illustrated in FIGS. 5 and 6, it will now be described how utilization of radio resources and signaling efficiency can be improved by employing the embodiments herein when granting uplink transmission in a TDM scheme. FIG. 5 shows an example where a conventional procedure for granting uplink transmission, referred to as "legacy granting", is used. In FIG. 5, a first wireless device, denoted UE1, is transmitting a larger amount of data on a channel called Enhanced Dedicated Physical Data Channel, E-DPDCH, which transmission spans over multiple TTIs. The persistent transmission from UE1 is interrupted by a second wireless device, denoted UE2, which need to send a small amount of data in a single TTI on the E-DPDCH. Thus, the uplink transmission of data shall switch from UE1 to UE2 for a single TTI and then back to UE1 by means of signaling on the E-AGCH as follows. It is assumed that UE1 and UE2 are being served by a network node.

In this conventional procedure, the above-mentioned messages Absolute Grant denoted "AG" and Zero-Grant denoted "ZG" are available for controlling the devices and four signalling messages are required. There is thus initially an ongoing data transmission on the E-DPDCH from UE1 in several TTIs (marked 1). First, the network node signals a ZG to UE1 in a step 500 to instruct UE1 to stop its transmission, which results in no data transmission in one TTI (marked black). Second, the network node signals an AG to UE2 in a step 502 which results in data transmission from UE2 in a TTI (marked 2). Third, the network node signals a ZG to UE2 in a step 504 to instruct UE2 to stop its transmission, which results in no data transmission in another TTI (marked black). Fourth, the network node signals an AG to UE1 in a step 506 which results in resumed data transmission from UE1 in further TTIs (marked 1).

As seen in FIG. 5, two TTIs are wasted, i.e. unused, during the switching of UE transmissions between UE1 and UE2 due the legacy granting operation with terminating and activating grants.

FIG. 6 shows how the same operation can be achieved using the improved granting scheme according to this solution. In FIG. 6, UE1 receives a "Single TTI" grant for transmission in a last TTI, as indicated by the AGS bit in a first grant message in step 600, before UE2 is scheduled to transmit a single TTI. This is for instructing UE1 to terminate its transmission after receiving the "Single TTI" grant.

Then a "Single TTI" grant is signalled to UE2 as indicated by the AGS bit in a second grant message in step 602 and UE2 transmits its small data amount in a single TTI (marked 2), and then UE1 can again be granted a persistent regular grant, as indicated by the AGS bit in a third grant message in step 604, to continue to empty its data buffer and transmit the data. It can thus be seen in FIG. 6 that not only wasted TTIs are avoided in the UE transitions, but also that one less granting message is required, i.e. three signalling messages in FIG. 6 instead of the four signalling messages required in FIG. 5. If the data to be transmitted by UE2 is a re-transmission and it is agreed that no grants are needed for retransmissions, even the "Single TTI" grant signalled to UE2 is unnecessary. However, if re-transmissions are agreed to be granted in "clean carrier" operation, the "Single TTI" grant is needed as illustrated in FIG. 6.

Figure 7:
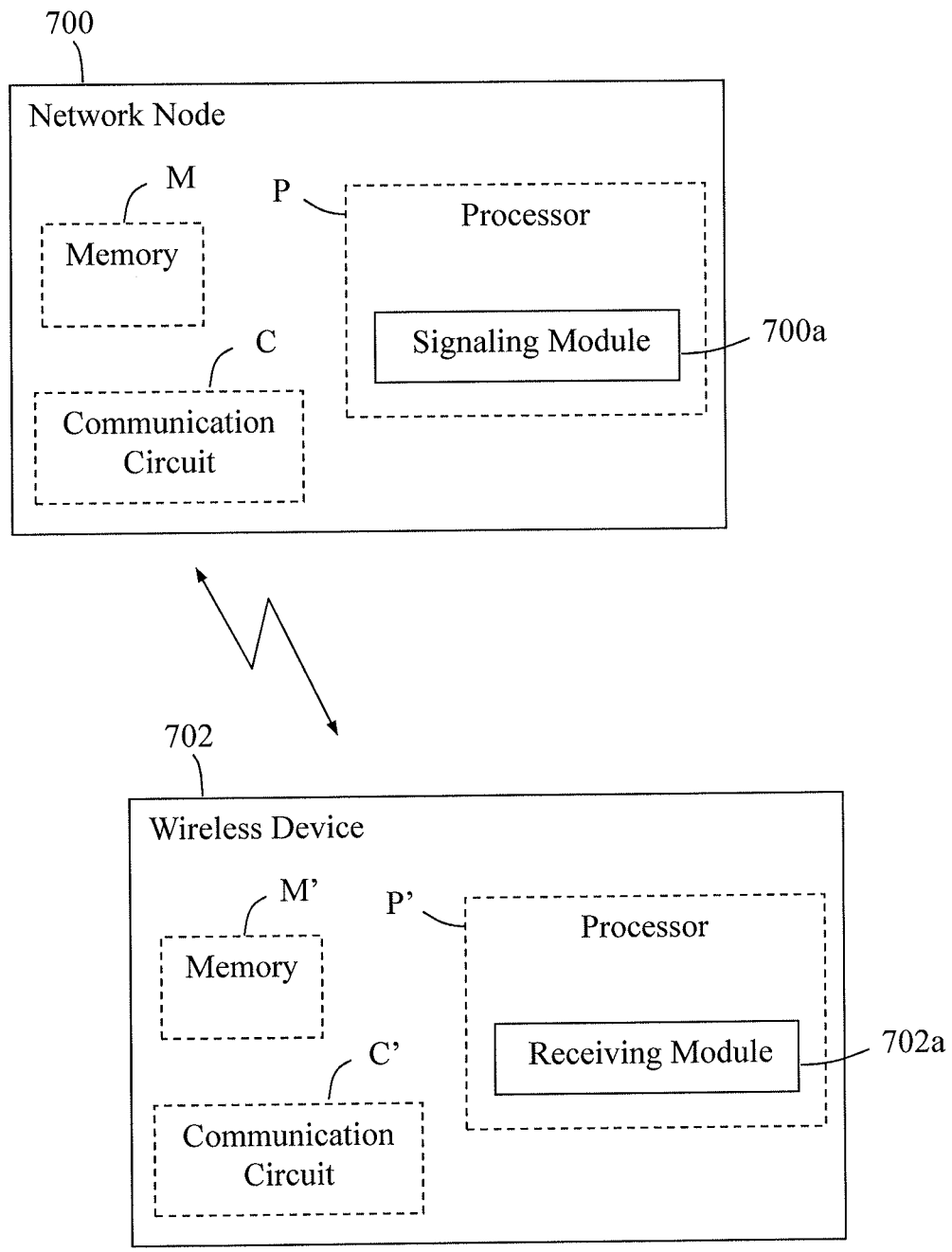
FIG. 7 is a block diagram illustrating a network node and a wireless device in more detail, according to further possible embodiments.

The block diagram in FIG. 7 illustrates a detailed but non-limiting example of how a network node 700 and a wireless device 702, respectively, may be structured to bring about the above-described solution and embodiments thereof. In this figure, the network node 700 and the wireless device 702 may be configured to operate according to any of the examples and embodiments of employing the solution as described above, where appropriate, and as follows. Each of the network node 700 and the wireless device 702 is shown to comprise a processor "P", a memory "M" and a communication circuit "C" with suitable equipment for transmitting and receiving signals with information in the manner described herein.

The communication circuit C in each of the network node 700 and the wireless device 702 thus comprises equipment configured for communication with each other over a radio interface using a suitable protocol for radio communication depending on the implementation.

The network node 700 comprises means configured or arranged to perform a procedure according to actions 200-206 in the flow chart of FIG. 2 in the manner described above. Further, the wireless device 702 comprises means configured or arranged to perform a procedure according to actions 300-306 in the flow chart of FIG. 3 in the manner described above. These actions may be performed by means of functional modules in the respective processor P in the network node 700 and the wireless device 702 as follows.

The network node 700 is arranged for controlling uplink transmission from a wireless device, such as device 702, e.g. in a time division multiplexing scheme. The network node comprises means configured to signal an Absolute Grant Scope, AGS, bit to the wireless device 702, wherein the AGS bit indicates one of:
the wireless device 702 is granted for uplink transmission during a single Transmit Time Interval, TTI, and
the wireless device 702 is granted for uplink transmission until a next grant is signalled to the wireless device 702.

This signalling activity may be performed by a signalling module 700a in the network node 700, e.g. in the manner described for actions 300-306 above.

The above network node may also be described as follows.

A network node 700 of a wireless network, arranged to control uplink transmission from a wireless device 702, e.g. in a time division multiplexing scheme, the network node 700 comprising means configured to signal a grant for uplink transmission and an Absolute Grant Scope, AGS, bit to the wireless device (702, wherein the AGS bit indicates one of:
the grant allows the wireless device 702 for uplink transmission during a single Transmit Time Interval, TTI, and
the grant allows the wireless device 702 for uplink transmission until a next grant is signalled to the wireless device 702.

The wireless device 702 is arranged to control uplink transmission, e.g. in a time division multiplexing scheme, when being served by a network node, such as network node 700, of a wireless network. The wireless device 702 comprises means configured to receive from the network node 700 signalling with an Absolute Grant Scope, AGS, bit wherein the AGS bit indicates one of:
the wireless device 702 is granted for uplink transmission during a single Transmit Time Interval, TTI, and
the wireless device 702 is granted for uplink transmission until a next grant is signalled to the wireless device.

This receiving activity may be performed by a receiving module 702a in the wireless device 702, e.g. in the manner described for actions 400-406 above.

The above wireless device may also be described as follows.

A wireless device 702 arranged to control uplink transmission, e.g. in a time division multiplexing scheme, when being served by a network node 700 of a wireless network, the wireless device 702 comprising means configured to receive from the network node 700 a grant for uplink transmission and an Absolute Grant Scope, AGS, bit, wherein the AGS bit indicates one of:
the grant allows the wireless device 702 for uplink transmission during a single Transmit Time Interval, TTI, and
the grant allows the wireless device 702 for uplink transmission until a next grant is signalled to the wireless device 702.

It should be noted that FIG. 7 illustrates various functional modules in the network node 700 and the wireless device 702, respectively, and the skilled person is able to implement these functional modules in practice using suitable software and hardware. Thus, the solution is generally not limited to the shown structures of the network node 700 and the wireless device 702, and the functional modules 700a and 702a therein may be configured to operate according to any of the features and embodiments described in this disclosure, where appropriate.

The functional modules 700a and 702a described above can be implemented in the network node 700 and in the wireless device 702, respectively, by means of program modules of a respective computer program comprising code means which, when run by the processor P causes the respective network node 700 and wireless device 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 700 and the wireless device 702 in the form of a memory having a computer readable medium and being connected to the processor P. The computer program product or memory M in each of the network node 700 and the wireless device 702 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 700 and wireless device 702.

The solution described herein may be implemented in each of the network node 700 and the wireless device 702 by a computer program comprising instructions which, when executed on at least one processor, cause the at least one processor to carry out the actions according to any of the above embodiments, where appropriate. The solution may also be implemented at each of the network node 700 and the wireless device 702 in a carrier containing the above computer program, wherein the carrier is one of an electronic signal, optical signal, radio signal, or computer readable storage medium.

Further features and details of the solution and its embodiments will now be described.

During the recent years mobile operators have started to offer mobile broadband based on 3GPP e.g. WCDMA (Wideband Code Division Multiple Access). Further, fuelled by new devices designed for data applications, the end user performance requirements are steadily increasing. Moreover, the large uptake of mobile broadband has resulted in that the traffic volumes that have to be handled by HSPA enabled WCDMA networks have grown significantly.

In order to improve HSPA uplink performance, Enhanced Uplink, EUL, was introduced in 3GPP Release 7, or Rel-7. Since the uplink by design is non-orthogonal, i.e. one uplink transmission may interfere with another uplink transmission, rigorous power control such as fast closed-loop power control is necessary to address the near-far problem where "near" transmissions require much less power than "far" transmissions. The NodeB, or base station, measures a received SIR of transmissions from a UE and sends power control commands in the downlink to the UE to adjust the transmission power. Power control commands can be transmitted using a Dedicated Physical Channel, DPCH, or, to save channelization codes, the F-DPCH (Fractional DPCH). The non-orthogonality between different UEs cause interference leakage between the UEs, and the uplink throughput is often limited to 2-3 Mbps (Megabits per second) in scenarios with multiple UEs.

To enable high-bitrate operation in a real-network environment, it is necessary to isolate high-bitrate (high RX power) UEs from UEs that are vulnerable to the high interference created by the high-bitrate UEs. E.g. speech users requiring considerably lower RX power at the NodeB. A natural way to accomplish this within the current HSPA technology is to make use of a "clean carrier" concept. Briefly, in this concept, carriers are divided into regular carriers and clean carriers. The regular carriers provide the basic needs of a UE. The clean carriers are dedicated exclusively to high-bitrate transmissions. On a clean carrier, UEs are scheduled by the network to transmit one at a time, e.g. according to a TDM scheme, in order to avoid interfering with one another.

There are different methods for accomplishing this using current, pre Rel-12 3GPP, standard. One method is to make use of the Inter-Frequency Handover (IFHO) procedure and another method is to make use of the 3GPP Rel-9 Dual-Carrier High-Speed Uplink Packet Access, HSUPA, feature, also known as Dual Cell E-DCH operation. However, operating a "clean carrier" using the methods mentioned above may come with some drawbacks such as latency and control channel overhead issues. In the 3GPP Rel-12 work item, further EUL Enhancements RP-132078, various uplink improvements which can improve the HSPA performance are standardized. One of the sub-topics, enabling high user bitrates in single and multi-carrier uplink mixed-traffic scenarios, introduce enhancements to the existing Rel-7 CPC and Rel-9 Dual-Carrier HSUPA features for a more efficient "clean carrier" operation.

One of the discussed enhancements in the work item Further EUL Enhancements is improved methods for granting users data transmissions on a "clean carrier". The motivation for introducing a grant handling enhancement is to avoid the drawbacks with operating a bursty high data rate traffic using legacy E-AGCH channel. The main drawbacks are:

The need for signaling two messages on the E-AGCH, one for starting and one for stopping data transmissions, which is explained in detail below.

Serious consequences for missed detection of the terminating grant.

Flexibility, e.g. ability to operate without TTI gaps between users.

TDM scheduling can be realized in the currently working system. It is assumed that in the TDM mode the Node B has to nominate one UE which will transmit for the next period, while the UE transmitting in the previous period has to be informed that it has to stop the transmission. For that operation two granting commands have to be issued:

E-AGCH with either ZERO, INACTIVE (to stop transmission for one UE)

E-AGCH with Absolute Grant Value (to start transmission for one UE)

A disadvantage of this approach is that ideally both commands need to be transmitted at once for seamlessly switching between UEs. Since commonly only one E-AGCH channel is used this is not possible. When switching UEs using legacy granting either one TTI will be lost (no UE transmitting with a high bitrate in one TTI between UE transmissions) or two UEs will transmit simultaneously with high grants for one TTI. This would cause either unused TTIs or very high interference for the overlapped TTI in both transmissions.

Table 1 below shows a comparison of the currently discussed granting methods in 3GPP which include:
New timing for zero-grant
Grant detection
Time limited grants
As seen in Table 1, there is at least one drawback with each one of the schemes.

TABLE 1

Comparison of the TDM schedulers [R1-141692]

| Technical Aspect | New timing for zero-grant | Grant Detection | Time Limited Grants |
|---|---|---|---|
| Gaps in scheduling | Yes: during 1-TTI rotations and possibly during retransmissions. | No | No |
| E-AGCH load | An additional zero-grant is needed to terminate each grant. | Minimum | Grant repetition is needed for sustained traffic. |
| Performance issues | Reduced delay-budget by 1 TTI for decoding the zero-grant in the UE. | Further study needed to see if a good balance can be achieved between missed detection and false detection of grants sent for other UEs. | None |
| Implementation impacts | Prioritization of the zero-grant in the UE's decoding procedure. | Re-interpretation of the AG. New detection threshold needed for AGs intended for other UEs. | Re-interpretation of AG. |

The work item description on Further EUL Enhancements defines the scope of the "enabling high user bitrates in single and multi-carrier uplink mixed-traffic scenarios" sub-topic as:
a) DTX/DRX enhancements (e.g. decouple DRX/DTX parameters between primary and secondary carriers, increase DTX cycles, increase DRX cycles, independent DTX parameterization)
b) Improved granting: Improved granting for secondary carriers and TDM operation
c) Improved power control after long DTX gap on secondary uplink frequency, if performance issues due to long data interruption are found.

In terms of improved granting, there have been different improvements proposed in the work item Further EUL Enhancements for improving the legacy granting. No agreements have been made on the topic since any of the proposed solutions cannot completely solve all legacy granting issues mentioned previously.

Main drawbacks with the "New timing for zero-grant" solution are the reduced delay-budget for decoding a zero-grant due to timing changes and the lack of capability for transmitting single TTIs (e.g. for re-transmissions).

The main drawbacks with the "Grant Detection" scheme are that it makes the system more complicated in different ways. The UE will require implementation of grant detection thresholds which can cause some uncertainty if all users have received the terminating grant or not. The scheme also impacts power control of E-AGCH channels. One other problem is that scheduling multiple UEs require using an additional legacy E-AGCH and that new UEs will need to monitor both the new and legacy E-AGCHs.

The main drawback with the "Time Limited Grants" scheme is that grant repetition is needed for sustained traffic.

An improved granting scheme according to embodiments herein may be used for granting high-bitrate users in TDM operation. The scheme is based on legacy E-AGCH granting but the interpretation of the Absolute Grant Scope bit, or AGS bit for short, is changed from indicating that the grant is a "Per HARQ process" grant to that the grant is a time limited "Single TTI" grant. If a UE is scheduled with a "single TTI grant" the grant is revoked after 1 TTI data transmission. The interpretation of the AGS bit is configurable by higher layer. That is the UE is configured from e.g. RNC if the AGS bit is indicating a "Per HARQ process" or "Single TTI" grant. UEs configured with the AGS bit indicating "Single TTI" grant will not be able to transmit using "Per HARQ process" grating, however this is not a major issue in the context of for example "clean carrier" operation where the "clean carrier" is a dedicated high-bitrate carrier.

The proposed "single TTI" granting method gives improved granting capabilities for chatty smartphone traffic or as mentioned above "high user bitrates in single and multi-carrier uplink mixed-traffic scenarios". Using the proposed "single TTI" granting method makes TDM scheduling much more flexible than when using legacy E-AGCH granting.

By using embodiments described herein, an improved flexible granting scheme may be achieved, e.g. for granting high-bitrate users in TDM operation. The scheme is based on legacy E-AGCH granting described below.

As specified in 3GPP TS 25.212, Multiplexing and channel coding (FDD), V11.7.0 [3GPP TS25.212], the Absolute Grant Channel, E-AGCH, contains 6 information bits:

Absolute Grant Value: $x_{agv,1}, x_{agv,2}, \ldots, x_{agv,5}$

Absolute Grant Scope: $x_{ags,1}$

The overall coding chain for E-AGCH is illustrated in FIG. 3.

The information bits $x_{agv,1}, x_{agv,2}, \ldots, x_{agv,5}$ transmitted in the E-AGCH are used for signaling an Absolute Grant Value to the UE. These bits are in the proposed granting scheme not altered and functions as per legacy.

The Absolute Grant Scope bit $x_{ags,1}$ is in legacy E-AGCH used for indicating if the transmitted grant is a "Per HARQ process" grant or not. That is if the transmitted grant value in the E-AGCH applied for a single HARQ process only or if it's applied for all the HARQ processes. For the proposed improved granting scheme the interpretation of the Absolute Grant Scope bit is changed from indicating if the grant is a "Per HARQ process" grant to that if the grant is a time limited "Single TTI" grant. The meaning of "Single TTI" grant is that a UE is scheduled for only 1 TTI data transmission and the grant is revoked after the data transmission.

The Information field mapping of the Absolute Grant Scope is in the current standard [3GPP TS 25.212] defined like this:

4.10.1A.2 Information Field Mapping of the Absolute Grant Scope

The value of $x_{ags,1}$ is set as specified in Table 16C.

TABLE 16C

Mapping of Absolute Grant Scope

| Absolute Grant Scope | $x_{ags,1}$ |
|---|---|
| "Per HARQ process" | 1 |
| "All HARQ processes" | 0 |

If the solution and embodiments described in this disclosure is introduced in 3GPP, an updated subchapter may be created in the specifications as follows:

4.10.1A.2 Information Field Mapping of the Absolute Grant Scope

If IMPROVED_GRANTING is not enabled the value of $x_{ags,1}$ is set as specified in Table 16C.1.

TABLE 16C.1

Mapping of Absolute Grant Scope

| Absolute Grant Scope | $x_{ags,1}$ |
|---|---|
| "Per HARQ process" | 1 |
| "All HARQ processes" | 0 |

If IMPROVED_ GRANTING is enabled the value of $x_{ags,1}$ is set as specified in Table 16C.2.

TABLE 16C.2

Mapping of Absolute Grant Scope

| Absolute Grant Scope | $x_{ags,1}$ |
|---|---|
| "Single TTI" | 1 |
| "Persistent" | 0 | where IMPROVED_GRANTING is a configurable parameter for enabling and disabling the improved granting scheme.

As mentioned above, the interpretation of the AGS bit may be configurable by higher layer signaling. That is the UE is configured from e.g. RNC to interpret the AGS bit either that the AGS bit is indicating a "Per HARQ process" or "all HARQ processes", or that the AGS bit is indicating "persistent grant" or "Single TTI" grant. The configuration can either be on detailed functionality level, more precisely a parameter turning on and off the "Single TTI" granting. Another way can be that the "Single TTI" granting functionality is part of a set of improvements turned on and off by a single parameter, e.g. "Further EUL Enhancements" or "Enabling higher bitrates" feature parameter.

UEs configured with the AGS bit indicating "Single TTI" grant will not be able to transmit using "Per HARQ process" granting as per legacy, however this is not a major issue in the context of for example "clean carrier" operation where the "clean carrier" is a dedicated high-bitrate carrier. However, the scope of this solution is not limited to "clean carrier" operation only but it can be used for controlling any uplink transmissions.

ABBREVIATIONS

3GPP Third Generation Partnership Project
CRC Cyclic redundancy check
DL Downlink
DPCH Dedicated Physical Channel
E-AGCH Enhanced dedicated channel Absolute Grant Channel
E-DCH Enhanced Dedicated Channel
E-DPDCH Enhanced Dedicated Physical Data Channel
EUL Enhanced uplink
F-DPCH Fractional Dedicated Physical Channel
HARQ Hybrid Automatic Repeat Request
HSUPA High-Speed Uplink Packet Access
IFHO Inter-Frequency Handover
SIR Signal-to-Interference Ratio
TDM Time Division Multiplexing
TTI Transmit Time Interval
UE User Equipment
UL Uplink
WCDMA Wideband Code Division Multiple Access While the solution has been described with reference to specific exemplifying embodiments, the description is generally only intended to illustrate the inventive concept and should not be taken as limiting the scope of the solution. For example, the terms "network node", "wireless device", "Absolute Grant Scope, AGS, bit", "Transmit Time Interval, TTI", "clean carrier", and "persistent uplink transmission" have been used throughout this disclosure, although any other corresponding entities, functions, and/or parameters could also be used having the features and characteristics described here. The solution is defined by the appended claims.

The invention claimed is:

1. A method, performed by a network node of a wireless network, for controlling uplink transmission from a wireless device, the method comprising:
    signalling in a first downlink transmission an Absolute Grant Scope (AGS) bit to the wireless device to trigger uplink transmission from the wireless device, wherein the AGS bit in the first downlink transmission includes a value indicating a grant for persistent uplink transmission during any number of Transmit Time Intervals (TTIs) until a next grant is signalled to the wireless device, and
    signalling in a second downlink transmission the AGS bit to the wireless device, wherein the AGS bit in the second downlink transmission includes a value indicating that the wireless device should terminate uplink transmission.

2. A method according to claim 1, wherein the network node signals the AGS bit in an Enhanced Dedicated Channel, E-DCH, Absolute Grant Channel, E-AGCH.

3. A method according to claim 1, wherein the network node signals the AGS bit to grant uplink transmission from the wireless device on a clean carrier dedicated to high bitrate transmissions.

4. A method according to claim 1, wherein the value comprises a first value of the AGS bit that indicates the grant for persistent uplink transmission during the any number of TTIs, and wherein a second different value of the AGS bit indicates a grant for uplink transmission during a single TTI.

5. A computer program comprising instructions which, when executed on at least one processor, cause the at least one processor to carry out the method according to claim 1.

6. A network node of a wireless network, the network node being arranged to control uplink transmission from a wireless device, the network node comprising:
- a memory storing a computer program; and
- a processor operable to execute the computer program to cause the processor to:
  - signal in a first downlink transmission an Absolute Grant Scope (AGS) bit to the wireless device to trigger uplink transmission from the wireless device, wherein the AGS bit in the first downlink transmission includes a value indicating a grant for persistent uplink transmission during any number of Transmission Time Intervals (TTIs) until a next grant is signalled to the wireless device, and
  - signal in a second downlink transmission the AGS bit to the wireless device, wherein the AGS bit in the second downlink transmission includes a value indicating that the wireless device should terminate uplink transmission.

7. A network node according to claim 6, wherein the processor is operable to signal the AGS bit in an Enhanced Dedicated Channel, E-DCH, Absolute Grant Channel, E-AGCH.

8. A network node according to claim 6, wherein the processor is operable to signal the AGS bit to grant uplink transmission from the wireless device on a clean carrier dedicated to high bitrate transmissions.

9. A network node according to claim 6, wherein the value comprises a first value of the AGS bit that indicates the grant for persistent uplink transmission during the any number of TTIs, and wherein a second different value of the AGS bit indicates a grant for uplink transmission during a single TTI.

10. A method, performed by a wireless device being served by a network node of a wireless network, for controlling uplink transmission, the method comprising:
- receiving in a first downlink transmission from the network node signalling with an Absolute Grant Scope (AGS) bit triggering uplink transmission, wherein the AGS bit in the first downlink transmission includes a value indicating a grant for persistent uplink transmission during any number of TTIs until a next grant is received by the wireless device, and
- receiving in a second downlink transmission from the network node signalling with the AGS bit, wherein the AGS bit in the second downlink transmission includes a value indicating that the wireless device should terminate uplink transmission.

11. A method according to claim 10, wherein the wireless device receives the AGS bit from the network node in an Enhanced Dedicated Channel, E-DCH, Absolute Grant Channel, E-AGCH.

12. A method according to claim 10, wherein the AGS bit received from the network node grants uplink transmission on a clean carrier dedicated to high bitrate transmissions.

13. A method according to claim 10, wherein the wireless device interprets the value of the AGS bit as indicating the grant for persistent uplink transmission during the any number of TTIs, and wherein a different value of the AGS bit would indicate a grant for uplink transmission during a single TTI.

14. A wireless device arranged to control uplink transmission when being served by a network node of a wireless network, the wireless device comprising:
- a memory storing a computer program; and
- a processor operable to execute the computer program to cause the processor to:
  - receive in a first downlink transmission an Absolute Grant Scope (AGS) bit from a network node triggering uplink transmission, wherein the AGS bit in the first downlink transmission includes a value indicating a grant for persistent uplink transmission during any number of Transmission Time Intervals (TTIs) until a next grant is received by the wireless device, and
  - receive in a second downlink transmission the AGS bit from the network node, wherein the AGS bit in the second downlink transmission includes a value indicating that the wireless device should terminate uplink transmission.

15. A wireless device according to claim 14, wherein the processor is further operable to receive the AGS bit from the network node in an Enhanced Dedicated Channel, E-DCH, Absolute Grant Channel, E-AGCH.

16. A wireless device according to claim 14, wherein the AGS bit grants uplink transmission on a clean carrier dedicated to high bitrate transmissions.

17. A wireless device according to claim 14, wherein the processor is further operable to execute the computer program to cause the processor to interpret the value of the AGS bit as indicating the grant for persistent uplink transmission during the any number of TTIs, and wherein a different value of the AGS bit would indicate a grant for uplink transmission during a single TTI.

* * * * *

UNITED STATES PATENT AND TRADEMARK OFFICE
CERTIFICATE OF CORRECTION

PATENT NO.         : 9,723,605 B2
APPLICATION NO.    : 14/408346
DATED              : August 1, 2017
INVENTOR(S)        : Konuskan et al.

Page 1 of 1

It is certified that error appears in the above-identified patent and that said Letters Patent is hereby corrected as shown below:

On the Title Page

On Page 2, in Item (56), under "OTHER PUBLICATIONS", in Column 2, Line 4, delete "Busan" and insert -- Busan, --, therefor.

In the Specification

In Column 4, Line 17, delete "HSPA." and insert -- HSDPA. --, therefor.

In Column 7, Line 21, delete "(100)" and insert -- 100 --, therefor.

In Column 10, Line 28, delete "(702," and insert -- 702, --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*